Dec. 2, 1924.

A. M. MERTZANOFF

HEATING APPARATUS

Filed June 10 1920

Inventor
André M. Mertzanoff
BY Conrad A. Deter
his ATTORNEY

Dec. 2, 1924. 1,517,518
A. M. MERTZANOFF
HEATING APPARATUS
Filed June 10 1920 6 Sheets-Sheet 6

Inventor
André M. Mertzanoff
BY Conrad A. Dieterich
his ATTORNEY.

Patented Dec. 2, 1924.

1,517,518

UNITED STATES PATENT OFFICE.

ANDRÉ M. MERTZANOFF, OF NEW YORK, N. Y., ASSIGNOR TO AMERICAN RADIATOR COMPANY, OF CHICAGO, ILLINOIS, A CORPORATION OF NEW JERSEY.

HEATING APPARATUS.

Application filed June 10, 1920. Serial No. 387,988.

*To all whom it may concern:*

Be it known that I, ANDRÉ M. MERTZANOFF, a subject of the King of Greece, residing at the city of New York, borough of Manhattan, in the county and State of New York, have invented certain new and useful Improvements in Heating Apparatus, of which the following is a full, clear, and exact specification.

My invention relates to improvements in heating apparatus in which a fluid is employed as the heating medium, and the same has for its object more particularly, to provide an apparatus in the form of a small, compact unit capable of developing a high room-heating efficiency, and particularly adapted for heating structures of moderate size.

Further said invention has for its object to provide a heating apparatus of the character specified by means of which the air, drawn from the various parts of a structure or chamber, will be circulated more actively, and the temperature thereof materially raised by being constantly brought into intimate contact with said apparatus.

Further said invention has for its object to provide a heating apparatus of the character specified, comprising primarily a heat generating member and a heat emitting member, in which the fluid, serving as the heating medium, will be caused to circulate rapidly through said heat emitting member, and be returned to said heat generating member with comparatively small loss in temperature.

Further said invention has for its object to provide a heating apparatus of the character described comprising primarily a heat generating member and a heat emitting member, in which said parts are so constructed, arranged and proportioned with respect to each other as to cause or induce the circulation of the heating medium therethrough at a higher mean temperature, and at a higher rate of flow than has heretofore been possible.

Further said invention has for its object to provide an apparatus formed as a unitary structure comprising primarily a heat generating member, a heat emitting member, and means formed integrally therewith, and so constructed and arranged with relation thereto that it will accommodate any increase in the volume of the heating fluid, and will also serve to separate the warmer, ascending currents from the cooler, descending currents thereof, and will impart a definite and positive direction to the flow of said warmer, ascending currents as said fluid circulates through the apparatus.

Further said invention has for its object to provide a heating apparatus of the character specified comprising a member serving primarily as a heat generating element, and a member formed as a plurality of sections of which the end one is extended vertically above the others to form an integral expansion chamber.

Other objects will in part be obvious, and in part be pointed out hereinafter.

It is well known that in order to obtain the highest efficiency in a heating apparatus employing a fluid, such as water, as the heating medium, said fluid must be properly circulated, i. e. the oppositely-travelling currents must be duly separated, and an unimpeded circuit or flow established, since the faster or higher the rate of flow, the higher and more uniform will be the temperature of said fluid, and as a result thereof all parts of the apparatus traversed by said fluid will be caused to acquire and retain a correspondingly high and uniform temperature.

To establish the required circulation it becomes necessary particularly to give definite direction to the flow of the heated currents, thereby inducing or guiding the same in the most direct manner to the remotest and highest point of the heat emitting portion of the apparatus, before the fluid is caused or permitted to return to the heat generating portion to be reheated and recirculated.

I have found that the object in view may be best attained by providing a heat generating element and a heat emitting element each formed as a plurality of sections connected together at their upper and lower ends to form a unitary structure, and by providing the section or portion of the heat emitting element, most remote from the heat generating element, with an integrally-formed expansion chamber at its upper end. By such construction and arrangement the heating medium will be caused to issue from the heat generating element at practically boiling temperature, and to travel at a high rate of flow through the upper portions of the heat emitting element to said expansion chamber where the entrained steam will be released, and the rate of flow of the fluid consequently reduced. Thereupon said fluid will immediately descend in said farthest removed section of the heat emitting element, and return by the most direct way (the bottom portions of said heat emitting sections) to the bottom of said heat generating element to be reheated and recirculated.

The highly heated fluid current, in passing directly across and through the upper connected portions of the several sections of the heat emitting element in contact with the less highly heated portions of the fluid contained in the upper ends of said sections, will intermingle therewith and impart a portion of its heat thereto, and further by the velocity of its flow will cause said less highly heated portions to be drawn in its wake towards and into the expansion chamber.

It will, of course, be obvious that any disposition of the heated fluid in the upper portions of the heat emitting sections to travel from the heat generating element towards the expansion chamber will naturally induce a reverse movement or flow of the fluid in the lower portions of the heat emitting sections towards the lower end of said heat generating element, with the result that a constant circulation of the heating medium at high temperature throughout both the heat generating and the heat emitting elements of the apparatus will be created and maintained.

To the attainment of the aforesaid objects and ends, my invention consists in the novel details of construction, and in the combination connection and arrangement of parts hereinafter more fully described, and then pointed out in the claims.

In the accompaying drawings forming part of this specification, wherein like numerals of reference indicate like parts:—

Figure 1:
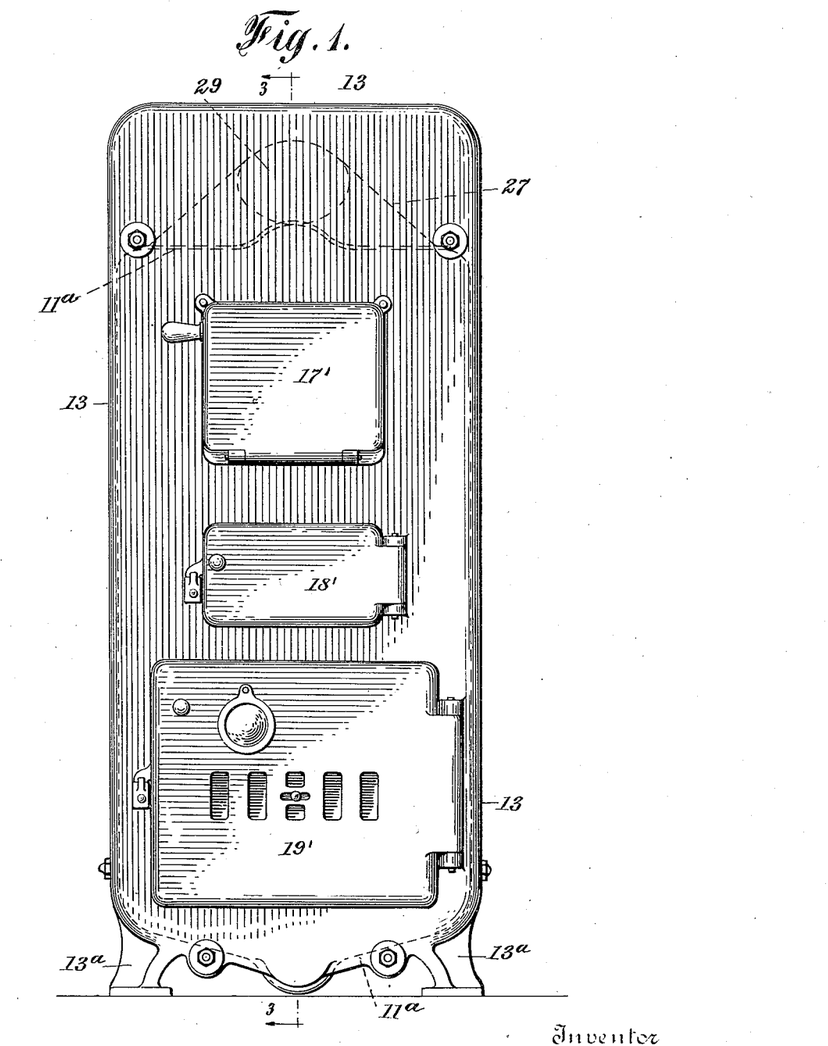
Figure 1 is a front elevation showing one form of heating apparatus constructed according to and embodying my said invention.
Figure 2:
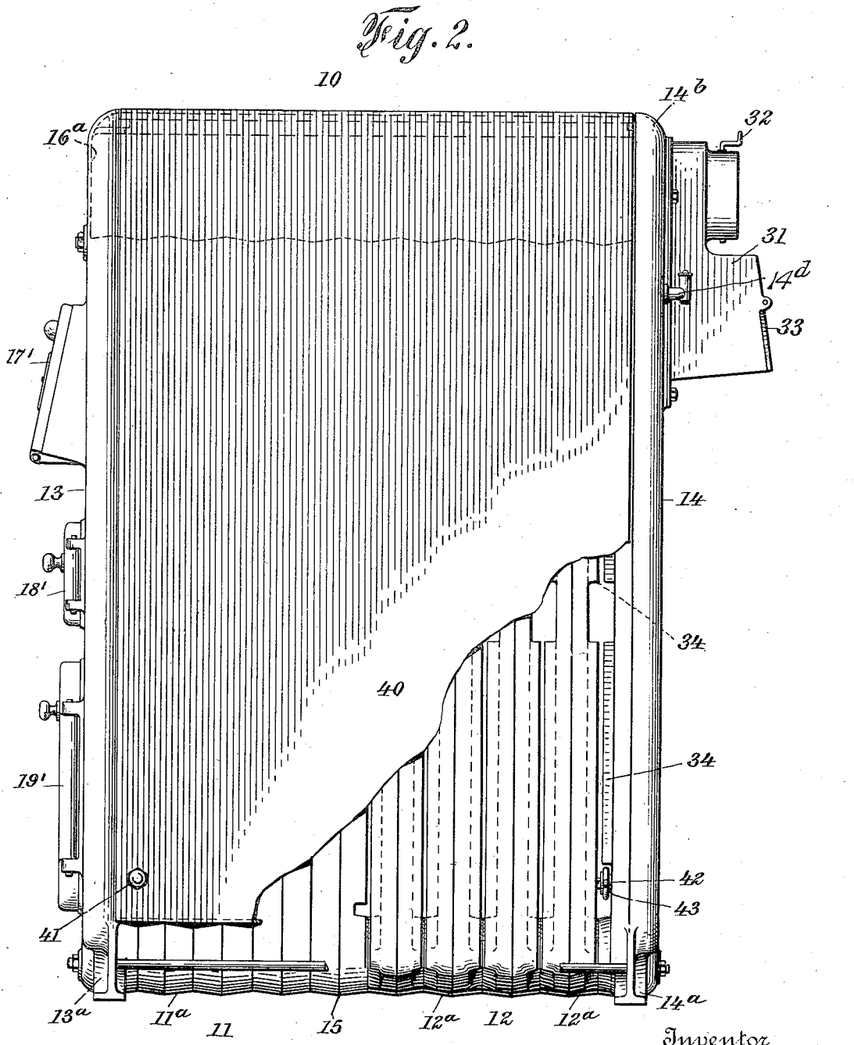
Fig. 2, is a side elevation.
Figure 3:
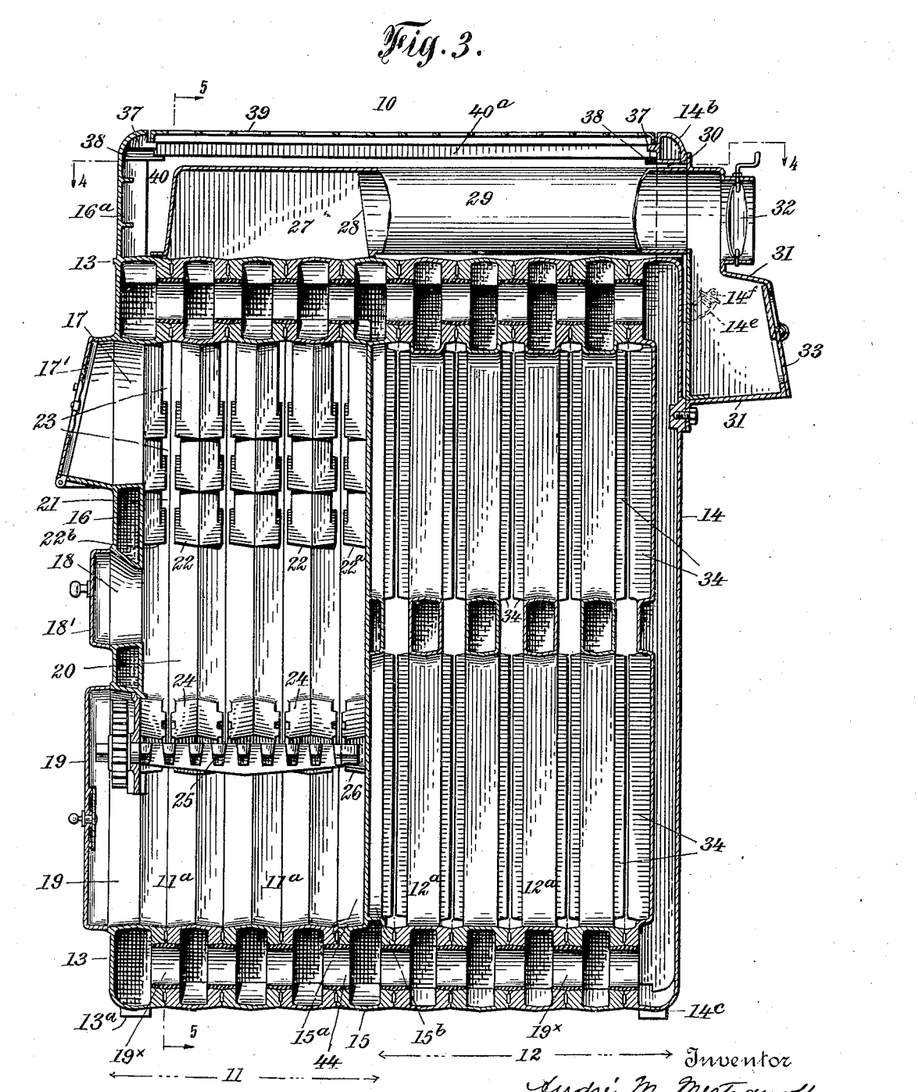
Fig. 3, is a longitudinal section on the line 3—3 of Fig. 1.
Figure 4:
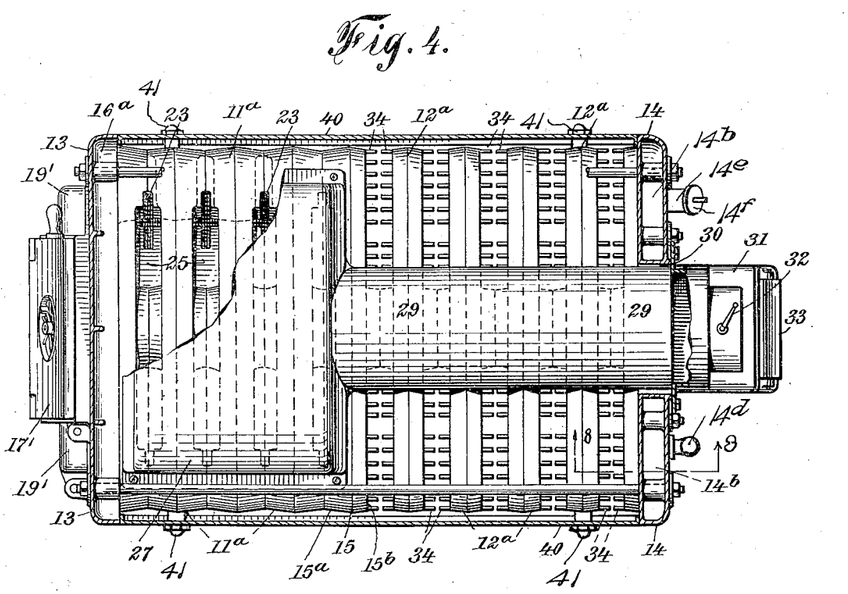
Fig. 4, is a horizontal section on the line 4—4 of Fig. 3.
Figure 5:
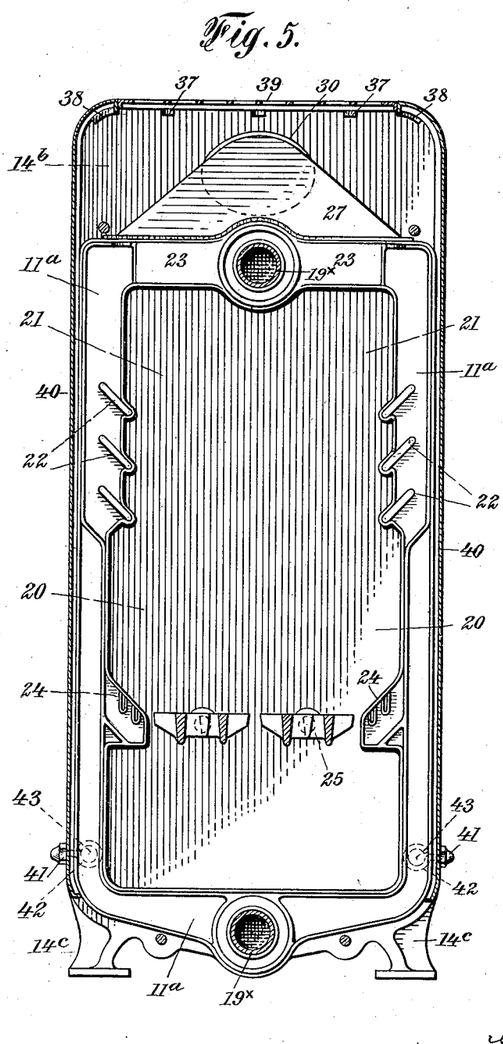
Fig. 5, is a vertical section on the line 5—5 of Fig. 3.
Figure 6:
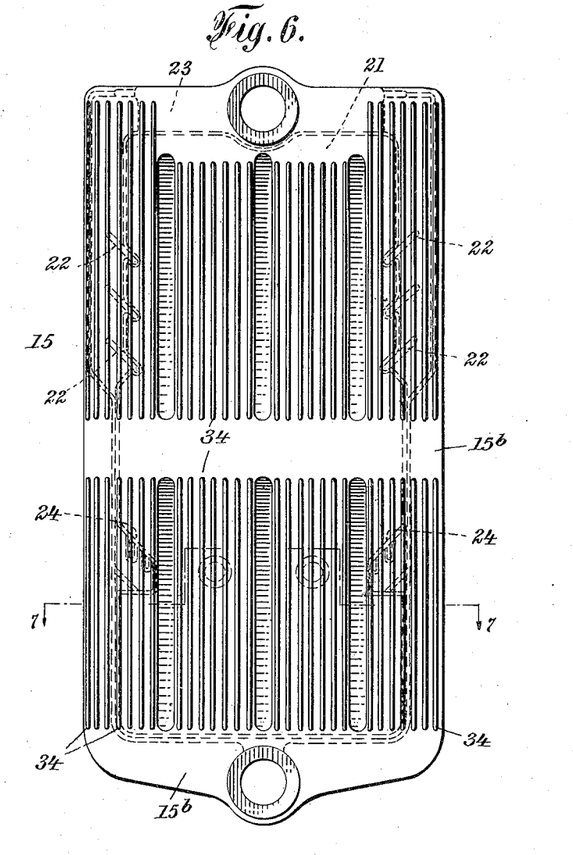
Fig. 6, is a side elevation of one face of the combination section forming the junction between the heat generating and heat emitting elements of the apparatus.
Figure 7:
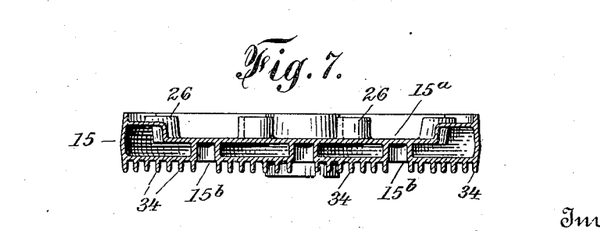
Fig. 7, is a transverse section on the line 7—7 of Fig. 6.
Figure 8:
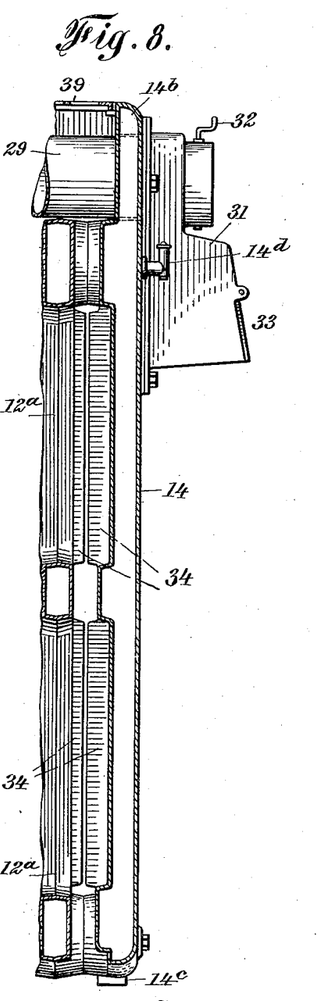
Fig. 8, is a detail vertical section of the back section of the apparatus taken on the line 8—8 of Fig. 4.

In said drawings, 10 designates the apparatus as a whole comprising essentially a member 11 whose primary function is to serve as a heat generating element, and a member 12 directly connected thereto serving as a heat emitting element.

The apparatus is preferably composed of a series of vertical sections each forming an endless water way or loop, and comprises a front section 13, a back section 14, a series of intermediate heat generating sections $11^a$, a series of intermediate heat emitting sections $12^a$, and a combination intermediate section 15, one side $15^a$ of which forms the back of the heat generating element, and the other side $15^b$ of which forms the front of the heat emitting element. The said combination section 15 further serves as a partition to divide or separate the heat generating element 11 from the heat emitting element 12.

The front section 13 which serves as the front of the heat generating element comprises a flat, hollow water portion 16, and an upwardly extending portion $16^a$ projecting from the top of said water portion 16, which is not water-backed, and constitutes a front wall portion for the upper part of the apparatus as a whole, and at its lower end said front section 13 is provided with legs $13^a$.

The front 13 is provided in its face with a fuel opening 17, a slicing opening 18 and an ash pit opening 19, provided with face plates to which are pivotally secured doors 17′, 18′, 19′, respectively.

The back 14 of the heat emitting element 12, which serves also as the back of the apparatus as a whole, is provided at its lower end with legs $14^c$, which with the legs $13^a$ of the front 13, serve to support the entire apparatus in slightly elevated position.

In order to provide for the expansion of the heating fluid, and to insure the desired circulation thereof throughout the apparatus, one or more of the sections of the heat emitting element may have their upper ends extended in a vertical plane above the tops of the intermediate sections of said heat emitting and said heat generating elements to form an expansion chamber. By preference I select the back section 14 and extend the same upwardly to form a hollow chamber $14^b$ located in a horizontal plane above the fluid level of the heating fluid within the apparatus, and provide said expansion chamber 14 with a suitable air relief valve $14^d$, and a filling nozzle $14^e$ having a removable cap $14^f$.

I further prefer to form the expansion chamber $14^b$ as an integral extension of the back section 14 as the said back section 14 and said integral extension thereof are located at the point farthest removed from the heat generating element 11. In consequence of this construction the heated fluid issuing from said generating element is given a definite and positive direction, and caused to travel at a high rate through the entire length of the heat emitting element, thereby inducing towards it and carrying along with it a large quantity of the heating fluid of lower temperature, which is thereby raised in temperature before it is returned to the heat generating element.

Between the heat generating element 11 and the heat emitting element 12, each of which consists of a series of sections connected together at their upper and lower ends by nipples 19$^x$, is provided a combination section 15, which corresponds in external contour with the intermediate sections of the elements 11 and 12, and is connected thereto. The forward face 15$^a$ of said combination section 15, which serves as the rear wall of the heat generating element 11, is conformed thereto, while its rear face 15$^b$, which serves as the front wall of said heat emitting element 12 is conformed thereto.

The intermediate sections 11$^a$ disposed between the front section 13 and the combination intermediate section 15 consist of hollow loops whose interior edges form a fire pot 20, and a reduced combustion chamber 21 arranged above the same.

The opposite inner walls of said intermediate sections 11$^a$, forming the combustion chamber 21, are provided with inwardly and downwardly inclined fins 22, and the rear wall of the front section 13, and the front wall 15$^a$ of the combination section 15 are provided with fin parts 22$^a$, 22$^b$, respectively, which register with the fins 22 of said intermediate sections. The adjacent edges of the fins 22 and the fin parts 22$^a$, 22$^b$ are separated so as to form flues communicating with openings 23 provided between the upper contacting edges of said intermediate sections 11$^a$ of the heat generating element, to permit of the escape of the products of combustion.

Below the fins 22, and the fin parts 22$^a$, 22$^b$, the sections 13, 11$^a$ and 15 are provided with short inwardly and downwardly inclined water-backed portions 24 which cooperate with revoluble grate bars 25 to support the fuel in the fire pot 20. The rear ends of said grate bars 25 are supported in socketed studs 26 provided upon the front wall 15$^a$ of the combination section 15, and the forward ends of said grate bars are supported in, and project through openings provided in the face plate disposed over the ash pit opening 19.

27 denotes a smoke-hood which is secured along its edges to the tops of the sections constituting the heat generating element 11, and is provided at its rear end with an opening 28 communicating with a flue 29 extending horizontally rearwardly through an opening 30 in the back 14, and communicates with a casting 31 connected to a stack or chimney, and provided with a suitable damper 32, and check draft damper 33.

The several intermediate sections 12$^a$ of the heat emitting element 12, as well as the rear wall of the combination section 15, and the forward wall of the back section 14 are provided upon their opposing faces with interrupted, outwardly-projecting vertical ribs or fins 34. The adjacent edges of said ribs or fins 34 register and almost meet forming flues to permit of the passage therethrough of the air which enters the same from the bottom of said heat emitting element.

The inner sides of the front wall part 16$^a$, and the expansion chamber portion 14$^b$, of the back 14 are provided with inwardly extending lugs 37, and segmental projections or lugs 38.

39 denotes a perforated plate or grill which is supported upon said segmental projections or lugs 38, and 40 denote side plates having their upper edges rounded and provided with longitudinal flanges 40$^a$ adapted to engage with the inner ends of said segmental projections or lugs 38 to support said side plates 40 in position upon the apparatus and spaced from the side walls of the intermediate sections thereof.

The lower edges of said side plates 40 terminate a short distance above the bottom of the apparatus, and are secured thereto by nuts 41 which engage bolts 42 disposed upon studs 43, arranged upon certain of the sections of the heat generating and heat emitting elements.

The said side plates 40 together with the front 13 and back 14 serve to enclose the intermediate portions of the apparatus and to form passages for, and induce the creation of convection currents through the same. By this arrangement the air drawn into the apparatus at the base thereof will be quickly and effectively heated, and discharged through the perforated plate or grill 39 into the room or chamber to be heated.

In order to obtain the most efficient functioning of the apparatus, particularly when the heating medium is circulating at its maximum temperature and rate of flow, it is essential that the heat absorbing surface of the apparatus always bear such relation to the heat emitting surface thereof, that the ability of the latter to emit heat shall always be greater than the capacity of the former to absorb heat.

The operation of the apparatus will be readily understood from the foregoing in connection with the following description.

The heat generating element 11 is fired in the usual manner, and the hot gases and products of combustion are caused to pass from the combustion chamber over and between the edges of the inclined fins 22 extending into the same and to issue through the apertures 23 at the upper ends of said sections 11ª, and thence pass through the smoke-hood 27, and flue 29 to the stack.

As soon as the water contained within said heat generating element 11, and the heat emitting element 12 becomes sufficiently heated it will rise in the sections of the generating element 11, and pass through the outlet port at its upper end, through the corresponding openings between the remainder of said sections directly to the expansion chamber 14ᵇ at the top of the back section 14. Upon entering the said expansion chamber 14ᵇ the rate of flow of the water will be lowered owing to the liberation of its entrained heated molecules or steam, and as a result the water will descend in said back section 14, and a reverse movement or flow will be established in the lower part of the apparatus towards the inlet or return port in the lower part of the heat generating element. As the ascending water current gradually becomes more heated, its rate of flow through the apparatus will be correspondingly increased, and its capacity to absorb additional heat materially enhanced.

As soon as the apparatus, including both the heat generating as well as the heat emitting elements, acquires a sufficiently high temperature the heat will be emitted therefrom in part by radiation, and in part by convection, if the apparatus is not enclosed. If the same be enclosed by side plates 40, and a perforated cover 39, as herein shown and described the apparatus will operate as a convector, and serve to draw the cold air in at its bottom, and cause the same to pass upwardly between the outer vertical walls or surfaces of said heat generating and said heat emitting elements and said side plates 40. The air is heated in its passage through the apparatus and by its contact with the walls of the numerous flues formed by the registering fins extending from the opposing sides of the several sections of the heat emitting element. The upgoing currents of air will be further heated by passing over the smoke-hood and the horizontal flue extending therefrom.

When the apparatus is operating at its maximum efficiency the water will attain a steaming temperature without causing any material increase in pressure therein.

Further it is to be noted that as the apparatus herein shown and described is a unitary and complete structure, and is comparatively small and conveniently portable, the same may be readily installed in any part of a building or chamber without the use of piping since it only requires a suitable connection to a chimney.

Having thus described my invention what I claim and desire to secure by Letters Patent is:

1. An apparatus of the character described, comprising a heat generating element and a heat emitting element; said heat emitting element having a vertically extended portion forming a chamber at a point removed from said heat generating element communicating directly with said heat emitting element, substantially as specified.

2. An apparatus of the character described, comprising a heat generating element and a heat emitting element; said heating element confining a circulating heating fluid, and said heat emitting element having a vertically extended portion at its rear end forming a chamber opening directly into said heat emitting element and communicating with the interior thereof above the level of the fluid therein, substantially as specified.

3. An apparatus of the character described, comprising a heat generating element and a heat emitting element, said heat emitting element being composed of a plurality of vertically-disposed connected sections, certain of said sections being of greater height than the other of said sections and forming a chamber in direct communication with said heat emitting element, substantially as specified.

4. An apparatus of the character described, comprising a heat generating element and a heat emitting element, said heat emitting element having a portion extending above the remainder of the apparatus at a point farthest removed from said heat generating element, and forming a chamber communicating directly with said heat emitting element, substantially as specified.

5. An apparatus of the character described, comprising a heat generating element and a heat emitting element consisting of a front portion, a back portion, and an intermediate portion of smaller outline than said front and said back portions, and a cover portion secured to the edges of said front and said back portions and open at its top and bottom, substanitally as specified.

6. An apparatus of the character described, comprising a heat generating element and a heat emitting element, said heat emitting element comprising a plurality of sections connected together and to said heat generating element, and the section of said heat emitting element farthest removed from said heat generating element having a vertically extended portion forming a chamber communicating directly with said heat emitting element, substantially as specified.

7. An apparatus of the character described, comprising a heat generating element composed of a plurality of connected sections, and a sectional heat emitting element comprising a plurality of sections connected together and to said heat generating element, and the section of said heat emitting element farthest removed from said heat generating element being of greater height than the remainder of the heat emitting sections to form an expansion chamber communicating directly with said heat emitting element, substantially as specified.

8. An apparatus of the character described, comprising a sectional heat generating element and a sectional heat emitting element connected directly thereto, and means formed as a part of said heat emitting element and located at a point remote from said heat generating element whereby to induce and accelerate the flow thereto of the heating medium caused to issue from said heat generating element, substantially as specified.

9. An apparatus of the character described, comprising a sectional heat generating element and a sectional heat emitting element, a front section for said apparatus constituting the front member of said heat generating element, a back section constituting the back member of said heat emitting element, and a combination section uniting said heat generating element with said heat emitting element; one side of said combination section constituting the back member of said heat generating element, and its other side constituting the front member of said heat emitting element, substantially as specified.

10. An apparatus of the character described, comprising a sectional heat generating element and a sectional heat emitting element, a front section for said apparatus constituting the front member of said heat generating element, a back section constituting the back member of said heat emitting element, said back member having an extended portion forming an expansion chamber, and a combination section uniting said heat generating element with said heat emitting element; one side of said combination section constituting the back member of said heat generating element, and its other side constituting the front member of said heat emitting element, substantially as specified.

11. An apparatus of the character described, comprising a front section, a back section and intermediate sections connected together, certain of said sections constituting a heat generating element, and other of said sections constituting a heat emitting element; said intermediate sections being smaller in outline than said front and back sections, and cover plates disposed intermediate the edges of said front and back sections whereby to form air passages intermediate said cover plates and the side walls of said heat generating and said heat emitting elements, substantially as specified.

12. An apparatus of the character described, comprising a front section, a back section and a plurality of intermediate sections, certain of said sections constituting a heat generating element, and other of said sections constituting a heat emitting element; said intermediate sections being smaller in outline than said front and back sections, and said back section having a portion thereof located in a horizontal plane above the remainder of said sections to form an expansion chamber, and cover plates secured intermediate the edges of said front and back sections in spaced relation to said intermediate sections whereby to form air passages between said cover plates and the side walls of said heat generating and said heat emitting elements, substantially as specified.

13. An apparatus of the character described, comprising a front section, a back section and a plurality of intermediate sections, certain of said sections constituting a heat generating element, and other of said sections constituting a heat emitting element; said intermediate sections being smaller in outline than said front and back sections, and said back section having a portion thereof located in a horizontal plane above the remainder of said sections to form an expansion chamber, a perforated plate supported by, and arranged intermediate said front and back sections and in spaced relation to said intermediate sections, and cover plates secured intermediate the edges of said front and back sections in spaced relation to said intermediate sections whereby to form air passages between said cover plates and the side walls of said heat generating and said heat emitting elements, substantially as specified.

14. An apparatus of the character described, comprising a front section, a back section and a plurality of intermediate sections, certain of said sections constituting a heat generating element and other of said sections constituting a heat emitting element; said intermediate sections being smaller in outline than said front and back sections, and said back section having a portion thereof located in a horizontal plane above the remainder of said sections to form an expansion chamber, a perforated plate supported and arranged intermediate said front and back sections and in spaced relation to said intermediate sections, cover plates arranged intermediate said front and back sections in spaced relation to said intermediate sections, and means arranged upon said front and back sections, and certain of said intermediate sections for securing said cover plates thereto, substantially as specified.

15. An apparatus of the character described comprising a heat generating element, a heat emitting element, a smoke hood on said heat generating element and communicating with the interior thereof, and a flue arranged above said heat emitting element and communicating with said smoke hood, substantially as specified.

16. An apparatus of the character described comprising a heat generating element, a heat emitting element, a casing enclosing said heat generating and said heat emitting elements, a smoke hood on said heat generating element and communicating with the interior thereof, and a flue arranged above said heat emitting element and communicating with said smoke hood, substantially as specified.

17. An apparatus of the character described comprising a heat generating element, a heat emitting element, a casing enclosing said heat generating and said heat emitting elements, a smoke hood, and a flue extending therefrom; said hood and flue being arranged wholly exteriorly to said heat generating and said heat emitting elements, but wholly within said enclosing casing, substantially as specified.

18. An apparatus of the character described comprising a heat generating element, a heat emitting element, a smoke hood, and a flue communicating with said smoke hood; said smoke hood and said flue together extending longitudinally across the top of said heat generating and said heat emitting elements, substantially as specified.

19. An apparatus of the character described comprising a heat generating element, a heat emitting element, a casing for said heat generating and said heat emitting elements, a smoke hood above said heat generating element, and a flue extending from said smoke hood longitudinally across the top of said heat emitting element and cooperating with said heat emitting element serving further to heat air currents passing through the apparatus, substantially as specified.

20. An apparatus of the character described comprising a heat generating element, a heat emitting element having air passages extending therethrough, a casing for said heat generating and said heat emitting elements, a smoke hood above said heat generating element, and a flue in the path of the air currents initially heated in their movement through said passages, and serving further to heat the same, substantially as specified.

21. An apparatus of the character described comprising a heat generating element, a heat emitting element, a casing enclosing said heat generating and said heat emitting elements; said casing having an air inlet at its base and an outlet at its top, a smoke hood on said heat generating element communicating with the interior thereof, and a flue connected at one end to said smoke hood and having its other end extending horizontally rearwardly therefrom above the top of said heat emitting element, and in the path of the heated air currents passing upwardly through said heat emitting element, substantially as specified.

22. An apparatus of the character described comprising a heat generating element formed of a plurality of connected conforming sections, said heat generating element having a plurality of outlets in the top thereof, and a heat emitting element formed of a plurality of connected conforming sections, a casing enclosing said heat generating and heat emitting elements; said casing having an air inlet at its base and an outlet at its top, a smoke hood secured to the top of said heat generating element and communicating with the interior thereof, and a separate flue connected at one end to said smoke hood and having its other end extending rearwardly therefrom in a horizontal plane above and free from the top of said heat emitting element but in the path of the heated air currents passing upwardly through said heat emitting element, substantially as specified.

23. An apparatus of the character described, comprising a heat generating element, a heat emitting element located at the rear of said first named element and in communication therewith, a smoke hood above said heat generating element communicating with the interior thereof, and a flue connected to said hood and extending rearwardly therefrom over the top of said heat emitting element, said flue being in the path of heated air currents passing upward through said heat emitting element, substantially as specified.

24. An apparatus of the character described, comprising a heat generating element, a heat emitting element located adjacent to one wall of said first named element and in communication therewith, a smoke hood above said heat generating element and communicating therewith, a flue connected to said hood and extending horizontally therefrom over the top of said heat emitting element, and a casing surrounding said elements and extending above said hood and flue, said casing having openings in the bottom and top thereof to permit circulation of currents of air past said heat emitting element and past said flue, substantially as specified.

25. An apparatus of the character described, comprising a heat generating element, a heat emitting element, means communicatively connecting said elements to permit circulation of fluid therein, said heat emitting element having a portion extending above the remainder thereof at a point farthest removed from said heat generating element, and forming a chamber communicating at the lower end thereof with the upper portion of said heat emitting element through which said fluid circulates, said chamber being arranged to constantly act to give positive direction to the flow of heating fluid, substantially as specified.

26. An apparatus of the character described, comprising a heat generating element composed of transverse sections, and a heat emitting element at the rear of said first named element and composed of transverse sections, all said sections being communicatively connected and secured together to form a unitary structure, the adjacent walls of the sections of said heat emitting element being spaced to provide vertical passages for the circulation of air currents therethrough, substantially as specified.

27. An apparatus of the character described, comprising a heat generating element composed of transverse sections, a heat emitting element composed of transverse sections arranged at the rear of said first named sections, all said sections being communicatively connected and secured together to form a unitary structure, the adjacent walls of the sections of said heat emitting element being spaced to provide vertical passages for the circulation of air currents therethrough, and vertical covers interposed between the front and back sections at opposite sides of said sections and forming therewith vertical passages therethrough, substantially as specified.

28. An apparatus of the character described, comprising a heat generating element composed of transverse sections, a heat emitting element composed of transverse sections arranged at the rear of said first named sections, the rearmost of said sections extending above the other of said sections to form an expansion chamber, and means communicatively connecting all said sections together at the upper and lower ends thereof, whereby said chamber is placed in direct communication therewith, substantially as specified.

Signed at the city of New York, in the county and State of New York, this 7th day of May, one thousand nine hundred and twenty.

ANDRÉ M. MERTZANOFF.

Witnesses:
CONRAD A. DIETERICH,
LOUIS B. HASBROUCK.